(12) United States Patent
Takase

(10) Patent No.: US 6,561,901 B1
(45) Date of Patent: May 13, 2003

(54) GAME SYSTEM AND COMPUTER READABLE STORAGE MEDIUM CARRYING GAME PROGRAM

(75) Inventor: Yasumi Takase, Ichikawa (JP)

(73) Assignee: Konami, Co., Ltd., Hyogo-ken (JP)

( * ) Notice: Subject to any disclaimer, the term of this patent is extended or adjusted under 35 U.S.C. 154(b) by 0 days.

(21) Appl. No.: 09/112,592

(22) Filed: Jul. 9, 1998

(30) Foreign Application Priority Data

Jul. 15, 1997 (JP) .............................................. 9-189632

(51) Int. Cl.$^7$ ................................................ A63F 13/00
(52) U.S. Cl. ............................ 463/24; 463/1; 463/29; 463/23
(58) Field of Search ........................ 463/24, 1, 40–44, 463/23, 29; 434/322, 323

(56) References Cited

U.S. PATENT DOCUMENTS

| | | | | |
|---|---|---|---|---|
| 4,445,187 A | * | 4/1984 | Best ............................ | 434/323 |
| 4,752,068 A | | 6/1988 | Endo | |
| 5,014,982 A | * | 5/1991 | Okada et al. .................. | 463/24 |
| 5,035,625 A | * | 7/1991 | Munson et al. ............. | 434/332 |
| 5,267,734 A | | 12/1993 | Stamper et al. | |
| 5,286,036 A | * | 2/1994 | Barabash ..................... | 273/429 |
| 5,624,316 A | * | 4/1997 | Roskowski et al. ........... | 463/45 |
| 5,643,083 A | * | 7/1997 | Hasegawa ..................... | 463/24 |
| 5,679,075 A | * | 10/1997 | Forrest et al. ................. | 463/9 |
| 5,689,561 A | * | 11/1997 | Pace ......................... | 463/29 |
| 5,703,951 A | * | 12/1997 | Dolphin ....................... | 380/25 |
| 5,716,273 A | * | 2/1998 | Yuen ............................ | 463/29 |
| 6,200,216 B1 | * | 3/2001 | Peppel ......................... | 463/1 |
| 6,325,292 B1 | * | 12/2001 | Sehr ............................. | 235/492 |

\* cited by examiner

*Primary Examiner*—Jessica Harrison
(74) *Attorney, Agent, or Firm*—Jordan and Hamburg LLP

(57) ABSTRACT

A game system includes: a manipulating unit to be manipulated by a player; a storage unit for storing program and data required to execute a game; an executing unit for executing the game based on a manipulation of the manipulating unit and storage contents in the storage unit; an interrupting unit for interrupting a progress of the game when the game being executed reaches a predetermined progress level; an requesting unit for requesting the player to input information to release the interruption of the game in response to the interruption of the game by the interrupting unit; and a managing unit for comparing the manipulation of the manipulating unit responsive to the request by the requesting unit with a releasing condition of the interruption which is stored in the storage unit in advance, for permitting the progress of the game ahead of the point of the interruption if the manipulation satisfying the releasing condition is performed and for inhibiting the progress of the game ahead of the point of the interruption if the manipulation satisfying the releasing condition is not performed.

8 Claims, 5 Drawing Sheets

GAME SYSTEM AND COMPUTER READABLE STORAGE MEDIUM CARRYING GAME PROGRAM

BACKGROUND OF THE INVENTION

1. Field of the Invention

The present invention relates to a computer game system and a storage medium for use with the game system.

2. Description of the Prior Art

There is known a computer game system which requests a player to input a password when he plays the game from the start or when he continues playing the game from the position where he suspended the game last time. In the game system of this kind, the game software notifies the password to the player according to the game completion degree or the player himself sets the password when suspending the game. Therefore, the player naturally knows the password which is required to restart and continue the game, and hence he can voluntarily go ahead in the game.

By the way, as appreciated from an example of a serial TV story or a serial publication, the compulsory interruption of the story makes the watchers or the readers wait for the next story and has an effect to keep on attracting the interests of the watchers or the readers, thereby booming the story and the publication. Applying this phenomenon to the game requires distributing a single game as a plurality of separate products (titles), and it requires a very complicated and troublesome management of manufacturing and distribution. In the above-mentioned conventional game system, the progress of the game is controlled by the player himself, and hence the game cannot be compulsorily interrupted by the software side to stop the progress of the player and make him wait.

SUMMARY OF THE INVENTION

It is an object of the present invention to provide a game system and a storage medium for use therewith, which can limit the player's voluntary game progress and make the player wait, thereby attracting the interests of the players for a long time.

According to one aspect of the present invention, there is provided a game system including: a manipulating unit to be manipulated by a player; a storage unit for storing program and data required to execute a game; an executing unit for executing the game based on a manipulation of the manipulating unit and storage contents in the storage unit; an interrupting unit for interrupting a progress of the game when the game being executed reaches a predetermined progress level; an requesting unit for requesting the player to input information to release the interruption of the game in response to the interruption of the game by the interrupting unit; and a managing unit for comparing the manipulation of the manipulating unit responsive to the request by the requesting unit with a releasing condition of the interruption which is stored in the storage unit in advance, for permitting the progress of the game ahead of the point of the interruption if the manipulation satisfying the releasing condition is performed and for inhibiting the progress of the game ahead of the point of the interruption if the manipulation satisfying the releasing condition is not performed.

In accordance with the game system thus configured, the progress of the game is interrupted if the game reaches the predetermined progress level, and the input needed to release the interruption is requested to the player. By this request, the player knows that the game is interrupted and that the releasing of the interruption requires a specific manipulation. If the player performs an appropriate manipulation, the interruption of the game is released and the player can restart the game. If the manipulation by the player is not appropriate, the game interruption cannot be released. The supplier of the game software does not notify the necessary manipulation during the progress of the game, but may periodically notify the player of the necessary manipulation via various media such as newspapers, magazines, television, radio, telephone and/or the internet. Thus, the voluntary game progress by the player is restricted and they are forced to stop playing the game until they knows the necessary manipulation via those media. As a result, the interests of the players may be reliably kept attracted to the game for a long time with a single game title.

Preferably, the game system may further include a saving unit for saving data corresponding to the progress level of the game by the point of the interruption, after the managing unit inhibits the progress of the game ahead of the point of the interruption. By this, the data by the time of the interruption may be safely saved.

In a preferred embodiment, the managing unit may be enabled when executing the game ahead of the point of the interruption based on the data saved by the saving unit. By this, the interruption is maintained even if the game is restated based on the saved data.

In another preferred embodiment, a plurality of levels may be set as the predetermined progress levels of the game, and the managing unit may inhibit the progress of the game ahead of the point of the interruption and permit the execution of the game within the progress levels prior to the progress level corresponding to the point of the interruption, if the manipulation satisfying the releasing condition is not performed. Therefore, even if the interruption is not released yet, the events prior to the interrupted point may be freely executed. The predetermined progress level of the game may be set on the basis of an achieved position in the game, or on the basis of a playing time of the game.

According to another aspect of the present invention, there is provided a storage medium for storing a game program readable by a computer game system to perform the processes of: an interrupting process for interrupting a progress of a game when the game being executed reaches a predetermined progress level; an requesting process for requesting a player to input information to release an interruption of the game in response to the interruption of the game by the interrupting process; and a managing process for comparing a manipulation by the player responsive to the request by the requesting process with a releasing condition of the interruption which is stored in advance, for permitting the progress of the game ahead of the point of the interruption if the manipulation satisfying the releasing condition is performed and for inhibiting the progress of the game ahead of the point of the interruption if the manipulation satisfying the releasing condition is not performed.

In accordance with the storage medium, the game system can execute the appropriate interruption and releasing of the interruption by reading the content of the storage medium by the game system.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

The preferred embodiment of the present invention will now be described below with reference to the attached drawings.

Figure 1:
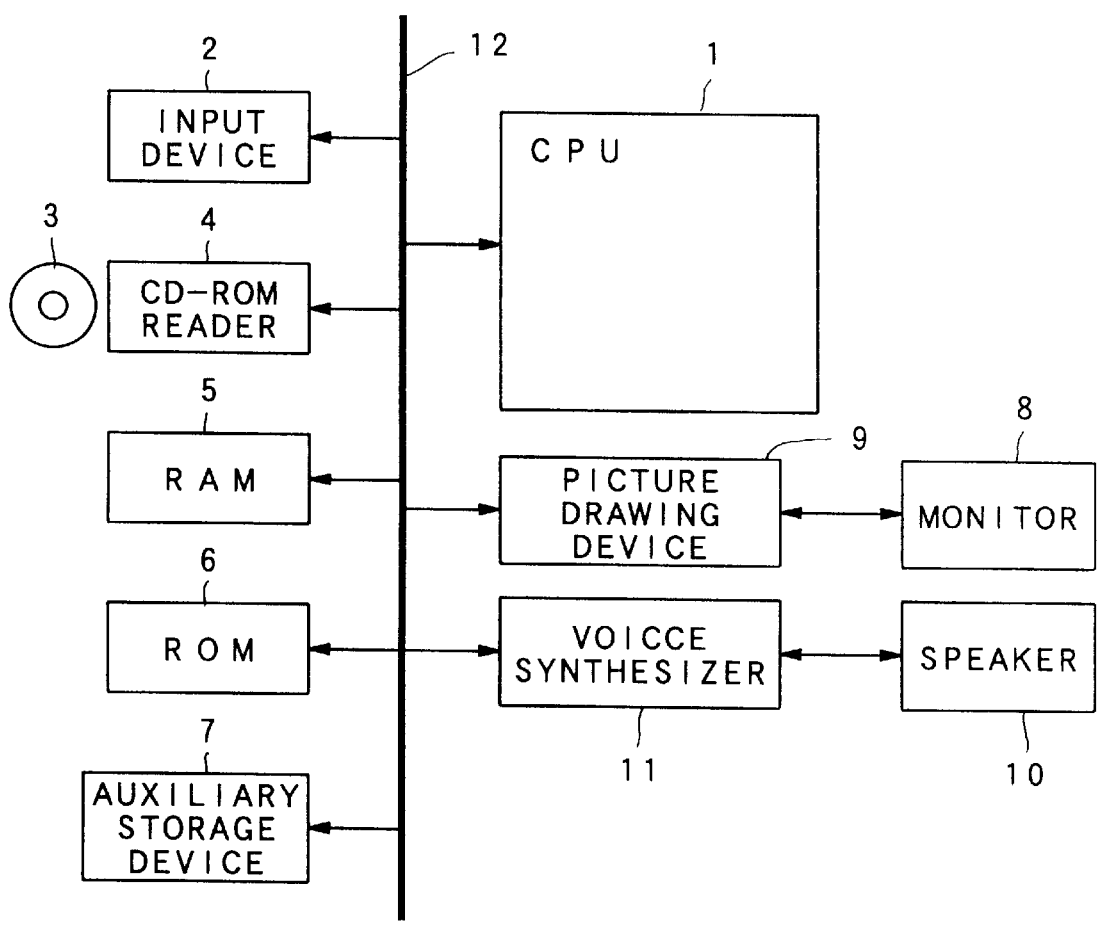
FIG. 1 is a block diagram illustrating a schematic configuration of a game system according to the present invention.

FIG. 1 is a block diagram showing the configuration of the game system according to the present invention. This game system includes the CPU 1, the input device 2, the CD-ROM reader 4, the RAM 5, the ROM 6, the auxiliary storage device 7, the picture drawing device 9 and the voice synthesizer 11. The CPU 1 is mainly constituted by a microcomputer and carries out various arithmetic operations and operational controls necessary for the progress of the game. The input device 2 serves as a manipulation unit adapted to output a signal in response to the player's manipulation. The CD-ROM reader 4 reads out information recorded on the CD-ROM 3 serving as a storage medium. The RAM 5 stores programs and data necessary for the progress of the game as required, and the ROM 6 stores program and data necessary to control the basic operation such as the start-up of the game system. The auxiliary storage device 7 stores data at the time of interrupting the game and data customized by the player. The picture drawing device 9 interprets the commands from the CPU 1 to draw desired pictures on the monitor 8, and the voice synthesizer 11 interprets the command from the CPU 1 to output desired voices from the speaker 10.

The CPU 1 is connected, via the bus 12, to the input device 2, the CD-ROM reader 4, the RAM 5, the ROM 6, the auxiliary storage device 7, the picture drawing device 9 and the voice synthesizer 11. When the game system is powered on by manipulating a power-on switch (not shown), the CPU 1 executes a given start-up processing according to the program and/or data stored in the ROM 6 and subsequently reads out the program and data from the CD-ROM 3 by the CD-ROM reader 4 to write them into the RAM 5. Then, the CPU 1 controls each unit of the system according to the storage contents of the RAM 5 and the manipulation of the input device 2 so that a game program recorded in the CD-ROM 3 is executed. The input device 2 is constituted by a game pad, a joystick or a mouse. The auxiliary storage device 7 is constituted by a non-volatile memory or a magnetic storage device, for example.

Figure 2:
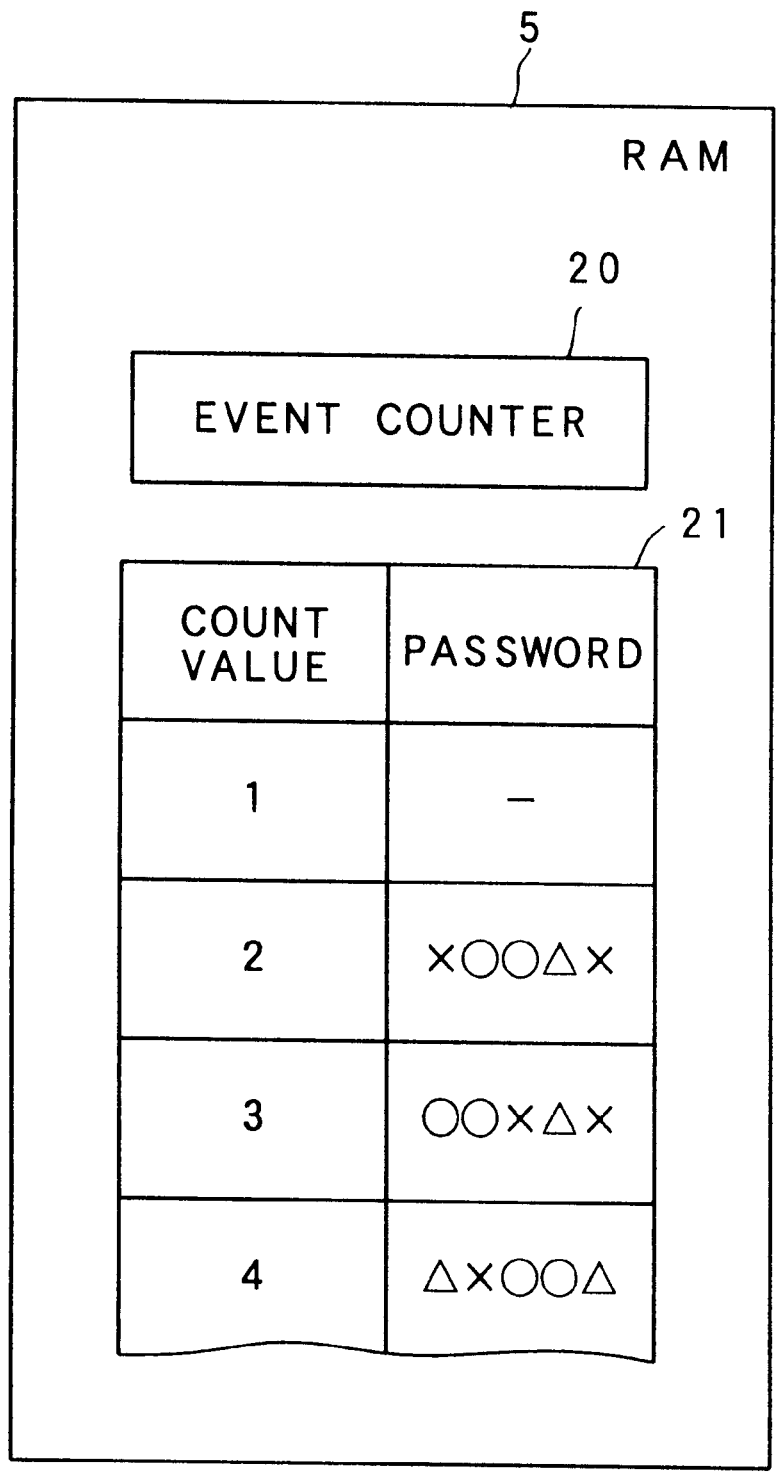
FIG. 2 is a diagram schematically illustrating an event counter and a password table formed in a RAM shown in FIG. 1.

When the program or data recorded on the CD-ROM 3 is written to the RAM 5, the event counter 20 and the password table 21 are formed in the RAM 5 as shown in FIG. 2. The game program recorded on the CD-ROM 3 may be a role playing game, for example, which includes a plurality of events or stages scheduled to take place in a predetermined order. In the event counter 20, the count value indicating the event of what order is presently going on is recorded. For example, the count value "1" is recorded if the first event is going on, and the count value "n" is recorded if the nth event is going on. In the password table 21, the count values of the events to be recorded in the event counter 20 and the passwords corresponding to the count values are recorded in a manner associated with each other as shown in FIG. 2. The passwords are different from event to event, and cannot be changed by the player. The CD-ROM 3 is not recorded with a program which notifies those passwords to the player.

Figure 3:
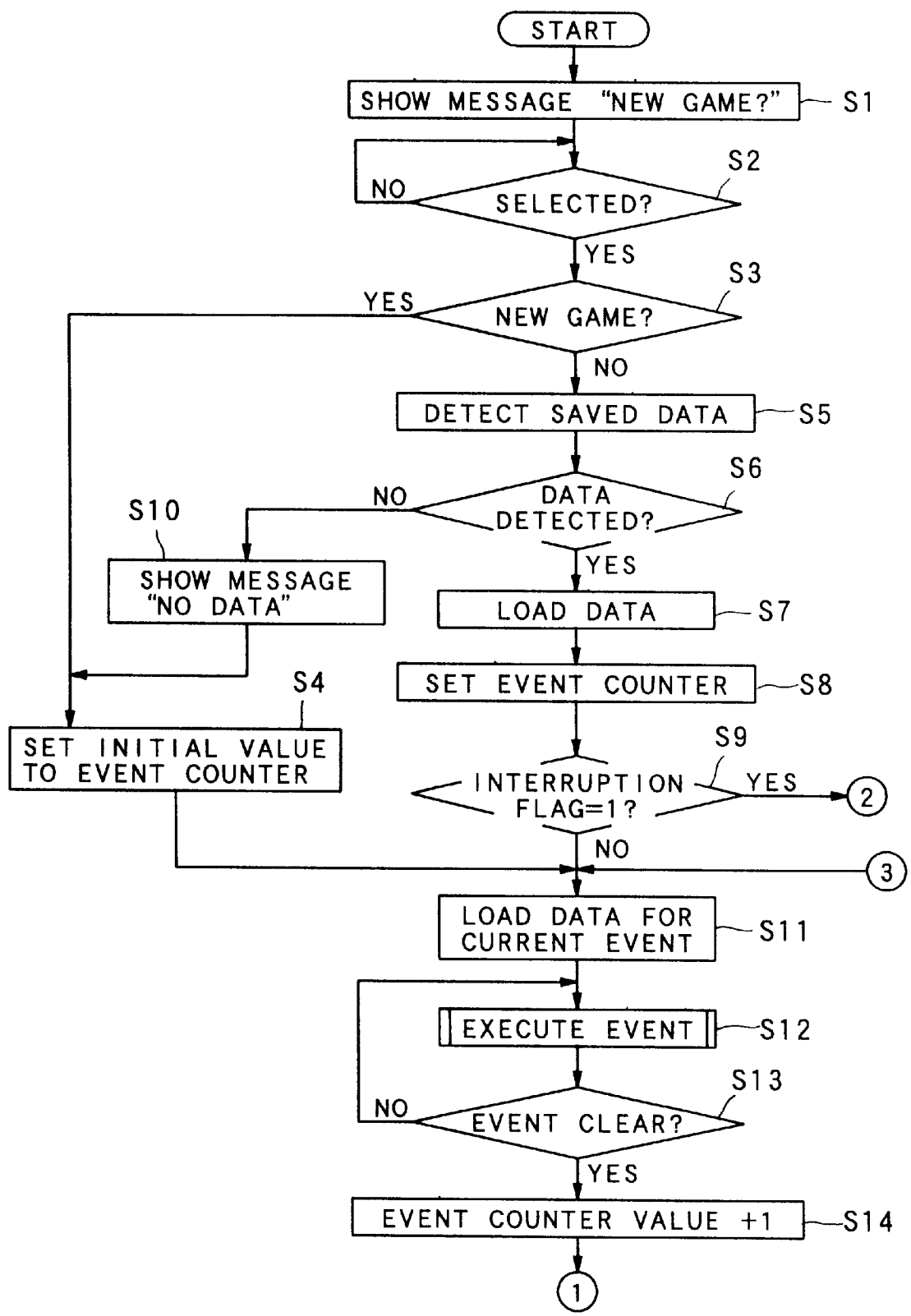
FIG. 3 is a part of a flowchart showing a game playing procedure executed by the game system of the present invention.
Figure 4:
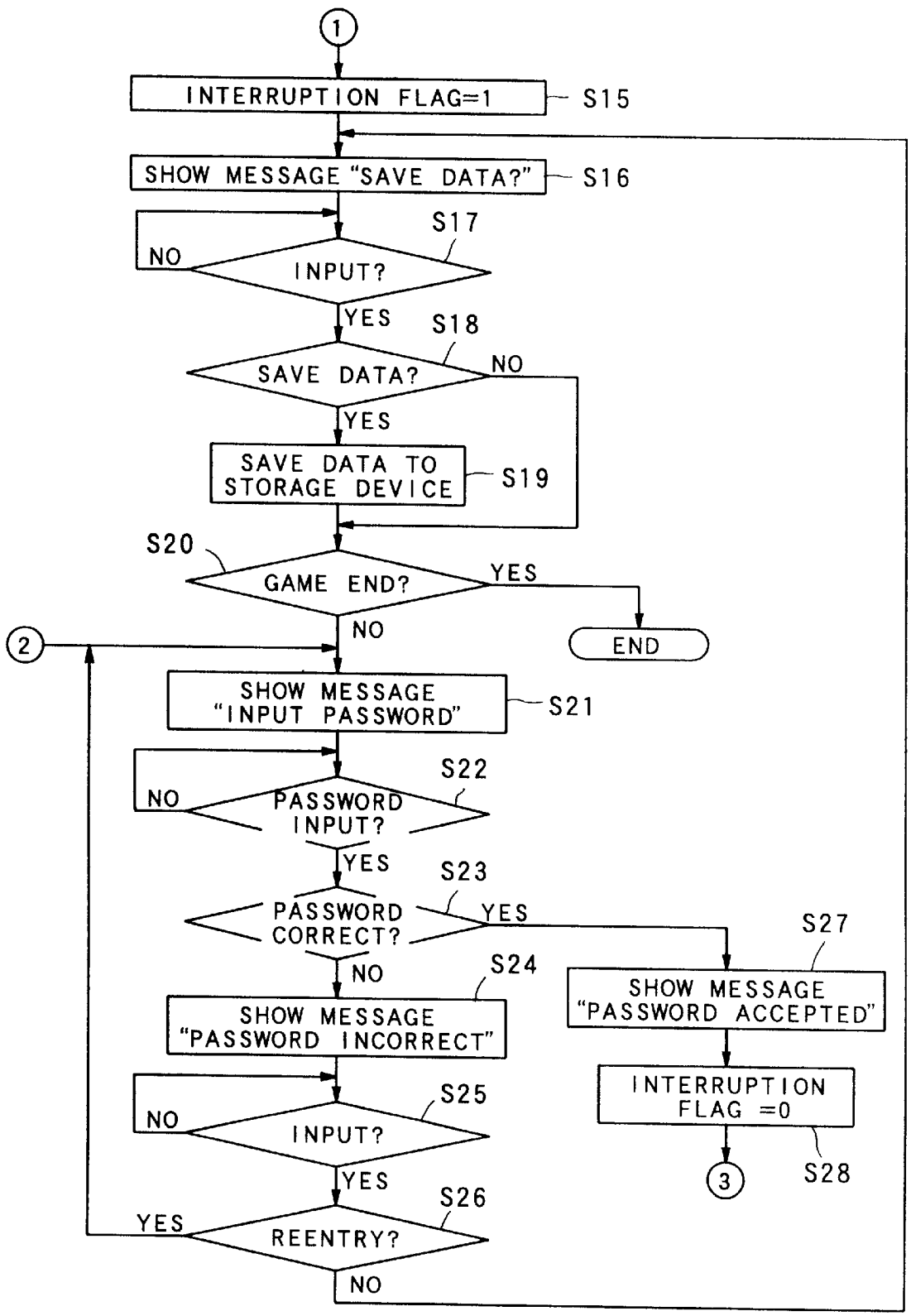
FIG. 4 is the other part of the flowchart shown in FIG. 4.

FIGS. 3 and 4 are flowcharts showing the procedure of the game system according to an embodiment of the present invention. When the CD-ROM 3 is set to the CD-ROM reader 4 and program and data necessary to start the game are loaded, the CPU 1 starts the processing shown in FIGS. 3 and 4. First, in step S1, the CPU 1 shows, on the monitor 8, a message requesting the player to select whether he plays the game from the start (i.e. start new game) or he restarts the game from the position where he suspended last time (i.e., continue the previous game). Then, the CPU 1 waits for the player's selection in step S2. When the player makes the selection using the input device 2, the process goes to step S3 where it is judged whether or not the new game is selected.

If the new game is selected, the initial value "1" is set to the event counter 20 in step S4, and then the process goes to step S11. If the continuation of the previous game is selected, the process goes to step S5 where data stored in the auxiliary storage device 7 is detected. Subsequently, it is judged in step S6 whether or not saved data exists in the auxiliary storage device 7. If saved data exists, the data is loaded to the RAM 5 in step S7, and the count value of the event that should be executed according to the saved data is set to the event counter 20 in step S8. Then, the process goes to step S9 where it is judged whether or not the interruption flag is equal to "1". If No, the process goes to step S11. The interruption flag indicates whether or not the further progress of the game is permitted. If the interruption flag is "1", the process jumps to step S21 shown in FIG. 4. If it is judged in step S6 that no saved data exists, the process goes to step S10 where a message indicating the absence of the saved data is displayed on the monitor 8, and then the process goes to step S4.

In step S11, the data necessary to execute the event corresponding to the current count value in the event counter 20 is loaded from the CD-ROM 3 to the RAM 5. After the loading, the event is executed in step S12, and the event is continued until the event clear is detected in step S13. The event clear is detected by setting a condition required to go to the next event and by determining whether or not the condition is satisfied. For example, the event clear is detected when the player defeats an enemy character in a fighting stage of a battle game or when the player collects all necessary items in a certain stage of an adventure game. A chance to save data may be given to the player even during the execution of the event in step S12.

If the event clear is detected in step S13, the count value of the event counter 20 is incremented by one in step S14, and then the process goes to step S15 shown in FIG. 4. In step S15, the interruption flag is set to "1" to interrupt the progress of the game. In the following step S16, a message suggesting the player to save the data until then into the auxiliary storage device 7 is displayed on the monitor 8. In step S17, the CPU 1 waits for the answer of the player inputted via the input device 2 and, if the input is detected, the process goes to step S18 to judge whether or not the data saving is instructed by the player. If the data saving is instructed, the data corresponding to the game progress level at that time is saved in the auxiliary storage device 7. The data saved at that time includes the count value of the event counter 20 and the value of the interruption flag. In the following step S20, it is judged whether or not the player instructs ending the game. If the data saving is not instructed in step S18, the process jumps to step S20.

Figure 5A:
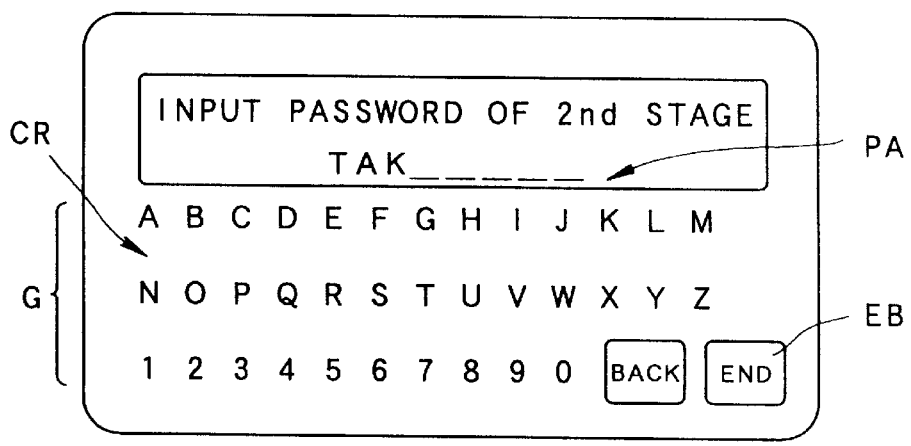
FIGS. 5A to 5C are diagrams of display examples shown in the course of playing game.
Figure 5B:
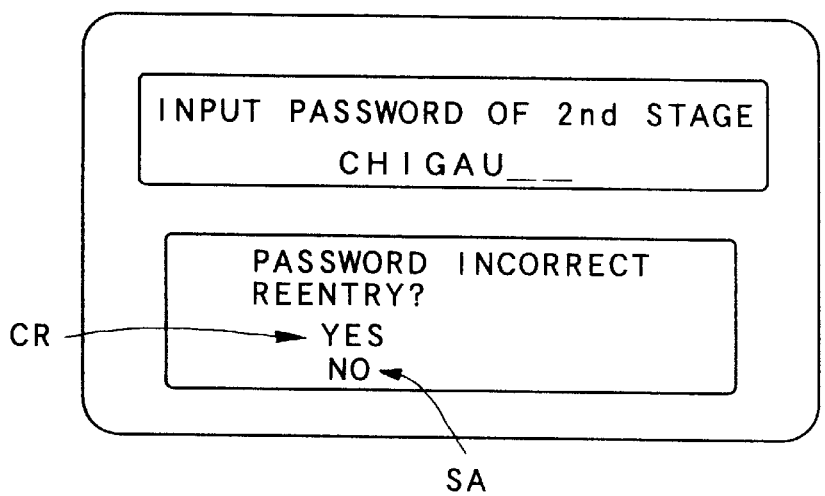

If it is judged in step S20 that the ending of the game is instructed, the game is terminated, otherwise the process goes to step S21. In step S21, a message is displayed on the monitor 8, which requests the player to input the password required to start the next event, and it is judged whether or not the password is inputted via the input device 2 in step S22. FIG. 5A is an example of a display requesting the player to input the password. In this example, the player manipulates the cursor keys provided on the input device 2 to move the cursor CR to the desired position in the character string G, and then presses the enter button to input the desired character at the password printing position PA. This operation is repeated to input all desired character string of the password, and then the cursor CR is moved to the position of the end button EB and the end button is pressed. Thus, the input of the password is completed, and it is judged in step S22 that the password is inputted. If it is judged in step S22 that the password is inputted, it is judged, by referring to the password table 21, whether or not the password corresponding to the count value of the current event counter 20 is coincident with the password thus inputted. If No, the process goes to step S24, where a message indicating the password discordance is displayed on the monitor 8. Then, in the following step S25, it is judged whether or not password reentry is selected by the player. FIG. 5B is an example of the password discordance message. In this example, an inquiry message SA about the password reentry is displayed. If the player elects the reentry by moving the cursor CR to the "YES" side and then presses the enter key, the password reentry is enabled. On the other hand, if the player moves the cursor CR to the "NO" side and presses the enter key, the reentry is disabled.

Figure 5C:
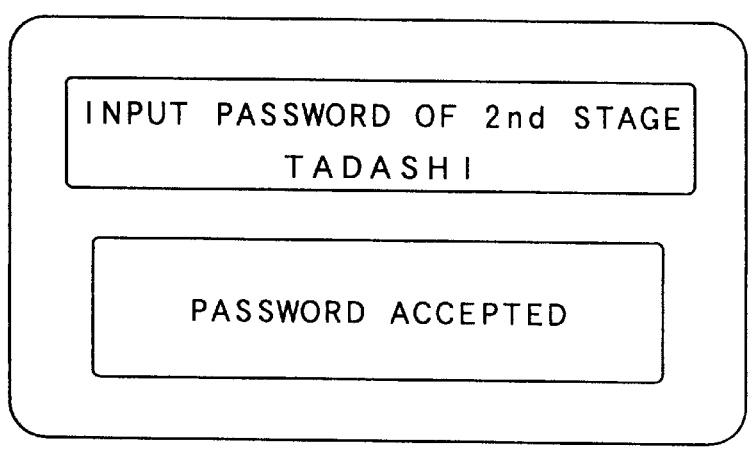

After the selection of the password reentry, the process goes to step S26 where it is judged whether or not the password reentry is selected. If the password reentry is selected, the process returns to step S21, otherwise the process returns to step S16. By this processing, a chance to save the data is given to the player after the password discordance is detected. On the contrary, if the password coincidence is confirmed, the process goes to step S27 where a predetermined confirmation message is displayed on the monitor 8. One example is shown in FIG. 5C. Subsequently, the interruption flag is set to "0" in step S28, and then the process goes back to step S11. By this, the game enters the next event.

According to the game system described above, the interruption flag is set to "1" when the player clears a predetermined event or stage, and the input of the password needed to proceed to the next event or stage is requested. The process passes through steps S23 to S24 and the player is not permitted to proceed to the next event or stage until he enters the correct password. If the player saves the data until then and ends playing game at that time without entering the correct password, he is requested to enter the correct password when restarting the game with the saved data, because the interruption flag is kept to be "1" and the process jumps from step S9 to step S21. The program recorded on the CD-ROM 3 never notifies the correct passwords to the player. Therefore, by notifying the passwords only periodically, the software supplier can keep the player at the waiting status for his progress in the game, and thereby enabling the attraction of the player's interest to the game for a long time.

Instead of writing the password table 21 into the RAM 5, the contents of the input made via the input device 2 may be compared with the password table 21 recorded on the CD-ROM 3 in step S23. The storage medium of the game program is not limited to the CD-ROM and may be a magnetic disk, a non-volatile RAM or other media of various types. The game program may be so designed that, during the interruption flag being set to "1", any events corresponding to the count values smaller than that of the event counter at that time can be freely executed.

In the above described embodiment, while the game is interrupted every time when one event is cleared, the timing of the interruption may be appropriately determined by taking the kinds of the games into account. For example, in the case of a shooting game or an action game, the game may be interrupted when the player finishes one or some stages. In the case of an adventure game, the game may be interrupted at each partitions such as "chapter" or "story". In the case of a simulation game, the game may be interrupted dependently upon a map or a time passage in playing the game. In the case of a sports game, the game may be interrupted every time when one or some matches end.

The input needed to release the interrupted status may be selected from some kinds of manipulations, and the progress of the game may be varied dependently upon the selection result. In many game software, a game playing status unknown to the player, such as a hidden command or a hidden character, is prepared, and the game software may be so designed that those game playing status may be available after releasing the interruption. Apart from notifying the player of information required to release the interruption of the game, data required to change the game playing status may be coded and periodically notified to the player so that the game may be played in a different status than ever with the newly added data. For example, in a professional baseball game, actual data of the existing professional baseball teams (e.g., the team members, the standing, the wins and loses, and/or the records of individual players) may be loaded into the baseball game so that the player can enjoy playing the game based on the actual status or condition of the team at that time, as if he is a player or a coach of that existing professional team.

As described above, according to the present invention, the game is interrupted according to the progress level thereof to notify the player of the need of a special manipulation, such as the input of the password, to release the interruption, and the player cannot go ahead in the game until the required correct manipulation is done. Therefore, the progress of the game by the players may be limited and the progress levels of players may be controlled by the game supplier. Therefore, the player's attraction to the game may be kept longer and more firmly, and the game may be boomed for a long time. In this respect, since there is no need to divide a single game software into a plural pieces (titles) and distribute them with delay times, the increase of the cost needed in the manufacturing and distribution may be avoided, and the burden on the user may also be decreased. Further, since the player is forced to stop the game by the compulsory interruption, an endless game play, especially by schoolchildren, may be reliably prevented.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

What is claimed is:

1. A game system comprising:

a manipulating unit to be manipulated by a player;

a storage unit for storing program information and data required to execute a game;

an executing unit for executing the game based on a manipulation of the manipulating unit and storage contents in the storage unit;

an interrupting unit for interrupting progress of the game when the game being executed reaches a predetermined progress level;

a requesting unit for requesting the player to input a responsive manipulation to release an interruption of the game in response to the interruption of the game by the interrupting unity, a releasing condition which is indicative of a particular manipulation being stored in the storage unit in advance of a request by the requesting unit, which, when entered by the player as the responsive manipulation, will permit the progress of the game to be resumed; and a managing unit for comparing the responsive manipulation entered by the played via the manipulating unit in response to the request by the requesting unit with the releasing condition which is stored in the storage unit in advance, and for permitting the progress of the game ahead of a point of the interruption if the responsive manipulation performed satisfies the releasing condition, and for inhibiting the progress of the game ahead of the point of the interruption if the responsive manipulation performed fails to satisfy the releasing condition, a correct responsive manipulation necessary to be inputted to the requesting unit by the player to effect satisfaction of the releasing condition stored in the storage unit being supplied to the player by an outside provider privy to said releasing condition.

2. A game system according to claim 1, further comprising a saving unit for saving data corresponding to the progress level of the game up to the point of the interruption, after the managing unit inhibits the progress of the game ahead of the point of the interruption.

3. A game system according to claim 2, wherein said managing unit is enabled when executing the game ahead of the point of the interruption based on the data saved by the saving unit.

4. A game system according to claim 1, wherein:

a plurality of levels are set as the predetermined progress levels of the game; and said managing unit inhibits the progress of the game ahead of the point of the interruption and permits the execution of the game within the progress levels prior to the predetermined progress level corresponding to the point of the interruption, if the responsive manipulation satisfying the releasing condition is not performed.

5. A game system according to claim 1, wherein said predetermined progress level of the game is set on the basis of an achieved position in the game.

6. A game system according to claim 1, wherein said predetermined progress level of the game is set on the basis of a playing time of the game.

7. A storage medium for storing a game program readable by a computer game system to perform the processes of:

an interrupting process for interrupting a progress of a game when the game being executed reaches a predetermined progress level;

a requesting process for requesting a player to input a responsive manipulation to release an interruption of the game in response to the interruption of the game by the interrupting process, a releasing condition which is indicative of a particular manipulation being stored in advance, which, when entered by the player as the responsive manipulation, will permit the progress of the game to be resumed; and a managing process for comparing the responsive manipulation entered by the player in response to the request by the requesting process with a releasing condition of the interruption which is stored in advance, and for permitting the progress of the game ahead of the point of the interruption if the responsive manipulation performed satisfies the releasing condition, and for inhibiting the progress of the game ahead of the point of the interruption if the responsive manipulation performed fails to satisfy the releasing condition, a correct responsive manipulation necessary to be inputted to the requesting unit by the player to effect satisfaction of the releasing condition stored in the storage unit being supplied to the player by an outside provider privy to said releasing condition.

8. A method of controlling a game by a control entity in which the game is played by a player entity different from the control entity comprising:

manipulating a manipulating unit by the player entity;

storing data required to execute a game in a storage unit;

executing the game based on manipulation of the manipulating unit by the player entity and based on the storage contents in the storage unit;

interrupting the progress of the game when the game being executed reaches a predetermined progress level;

providing a requesting unit requesting the player entity to input a responsive manipulation to release an interruption of the game in response to the interruption of the game by the interrupting unit, a releasing condition which is indicative of a particular manipulation being stored in advance, which, when entered by the player entity as the responsive manipulation, will permit the progress of the game to be resumed, said control entity being privy to the releasing condition stored in advance;

comparing the responsive manipulation entered by the player entity via the manipulating unit in response to the request by the requesting unit with the releasing condition which is stored in the storage unit in advance;

permitting the progress of the game beyond the point of the interruption if the responsive manipulation performed satisfies the releasing condition;

inhibiting the progress of the game beyond the point of interruption if the responsive manipulation performed fails to satisfy the releasing condition; and controlling the distribution by the control entity to the player entity of the information necessary to be inputted to the requesting unit by the player entity to effect satisfaction of the releasing condition so that further progress of the interrupted game is inhibited until said control entity distributes said information to said player entity.

* * * * *